(12) United States Patent
Tomura et al.

(10) Patent No.: US 7,993,544 B2
(45) Date of Patent: Aug. 9, 2011

(54) CLATHRATE HYDRATE WITH LATENT HEAT STORING CAPABILITY, PROCESS FOR PRODUCING THE SAME, AND APPARATUS THEREFOR, LATENT HEAT STORING MEDIUM, AND METHOD OF INCREASING AMOUNT OF LATENT HEAT OF CLATHRATE HYDRATE AND PROCESSING APPARATUS FOR INCREASING AMOUNT OF LATENT HEAT OF CLATHRATE HYDRATE

(75) Inventors: Keiji Tomura, Tokyo (JP); Shingo Takao, Tokyo (JP)

(73) Assignee: JFE Engineering Corporation, Tokyo (JP)

( * ) Notice: Subject to any disclaimer, the term of this patent is extended or adjusted under 35 U.S.C. 154(b) by 0 days.

(21) Appl. No.: 12/807,044

(22) Filed: Aug. 25, 2010

(65) Prior Publication Data

US 2010/0327217 A1    Dec. 30, 2010

Related U.S. Application Data

(63) Continuation of application No. PCT/JP2008/053683, filed on Feb. 29, 2008.

(51) Int. Cl.
*C09K 3/18* (2006.01)
*C09K 5/00* (2006.01)

(52) U.S. Cl. .......... 252/70; 428/402.2; 422/198; 252/71

(58) Field of Classification Search ......................... None
See application file for complete search history.

(56) References Cited

FOREIGN PATENT DOCUMENTS

| JP | 57-35224 | | 6/1982 |
|---|---|---|---|
| JP | 2004-331935 | A | 11/2004 |
| JP | 3309760 | | 11/2004 |
| JP | 2005-036060 | A | 2/2005 |
| JP | 2006-176674 | A | 7/2006 |
| JP | 2008-106123 | * | 5/2008 |
| JP | 20088-106123 | A | 5/2008 |

OTHER PUBLICATIONS

Oct. 21, 2010 English language translation of an International search report in connection with International patent application No. PCT/JP2008/053683.
Wateru Shimada et al., "Sepatation of Gas Molecules Using Tetra-*n*-butyl Ammonium Bromide Semi-Clathrate Hydrate", Jpn. J. Appl. Phys. vol. 42 (2003) Pt. 2, No. 2A, pp. L129-L131.
Yasushi Kamata et al., "Gas Separation Method Using Tetra-*n*-butyl Ammonium Bromide Semi-Clathrate Hydrate", Jpn. J. Appl. Phys., vol. 43, No. 1 (2004), pp. 362-365.
International Search Report Issued by the International Searching Authority (ISA/JP) on May 27, 2008 in connection with International Application No. PCT/JP2008/053683.
Written Opinion of the International Searching Authority (ISA/JP) Issued in connection with PCT/JP2008/053683 on May 27, 2008.

* cited by examiner

*Primary Examiner* — Necholus Ogden, Jr.
(74) *Attorney, Agent, or Firm* — John P. White; Cooper & Dunham LLP

(57) ABSTRACT

An apparatus for production of a clathrate hydrate with enhanced latent heat storing capability includes a gas supplier for supplying a gas to an aqueous solution containing a quaternary ammonium compound, and a cooler for cooling the aqueous solution, the apparatus producing the clathrate hydrate with enhanced latent heat storing capability including both the quaternary ammonium compound and the gas as guests by supplying the gas to the aqueous solution with the gas supplier in the stage of cooling with the cooler.

2 Claims, 4 Drawing Sheets

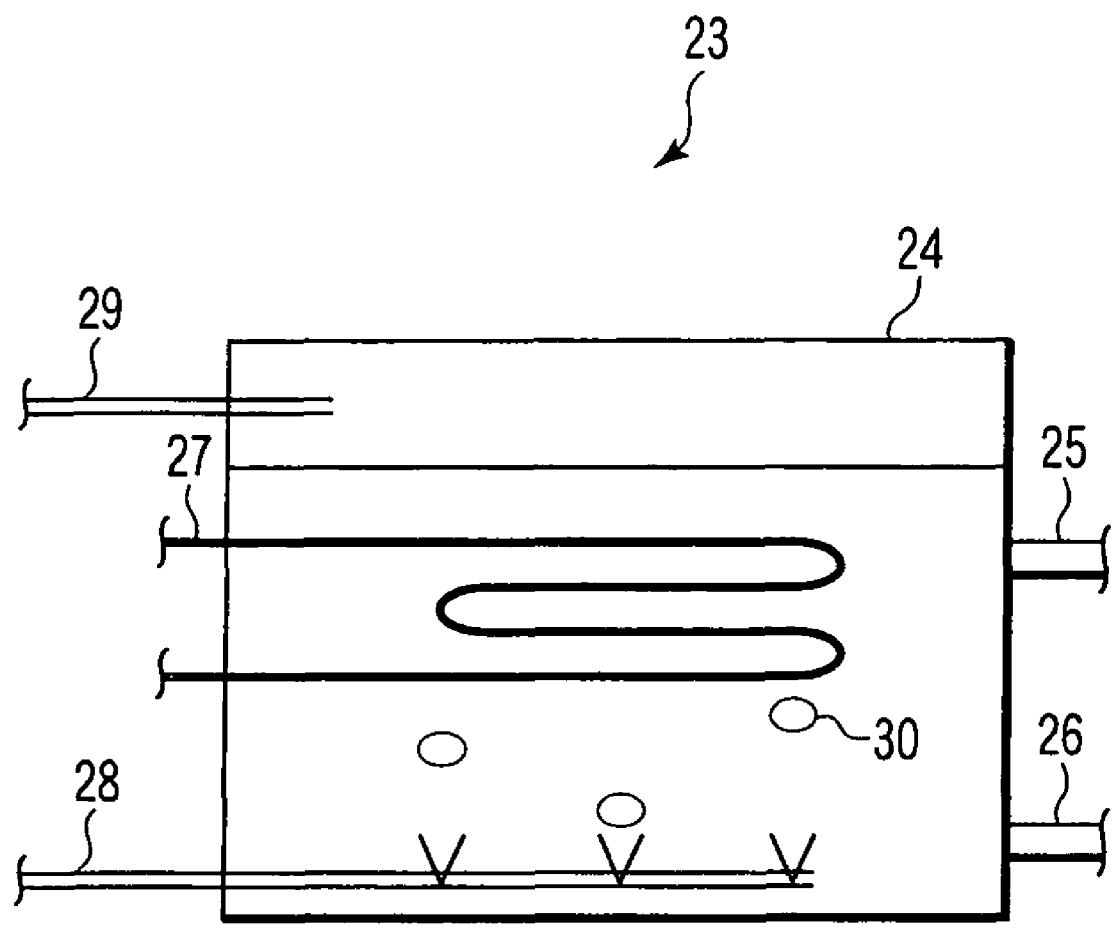
F I G. 4

US 7,993,544 B2

CLATHRATE HYDRATE WITH LATENT HEAT STORING CAPABILITY, PROCESS FOR PRODUCING THE SAME, AND APPARATUS THEREFOR, LATENT HEAT STORING MEDIUM, AND METHOD OF INCREASING AMOUNT OF LATENT HEAT OF CLATHRATE HYDRATE AND PROCESSING APPARATUS FOR INCREASING AMOUNT OF LATENT HEAT OF CLATHRATE HYDRATE

CROSS-REFERENCE TO RELATED APPLICATIONS

This is a Continuation Application of PCT Application No. PCT/JP2008/053683, filed Feb. 29, 2008, which was published under PCT Article 21(2) in Japanese.

BACKGROUND OF THE INVENTION

1. Field of the Invention

The present invention relates to a clathrate hydrate with latent heat storing effects and technologies associated with the same. More particularly, the present invention relates to a clathrate hydrate with enhanced latent heat storing effects, a process for producing the clathrate hydrate and an apparatus therefor, a latent heat storing medium comprising the clathrate hydrate as a composition, a method of increasing the amount of latent heat of the clathrate hydrate and a processing apparatus for increasing the amount of latent heat of the clathrate hydrate.

2. Description of the Related Art

A latent heat storing medium finds applications in the efficient use of thermal energy. There are many examples of actual applications thereof such as a heat storing material or thermal transport medium for use in air conditioning and a cold insulator for use in the preservation of fresh food quality. Clathrate hydrates comprising a quaternary ammonium compound as a guest (or guest molecules) and water molecules as a host (or hose molecules) are known as providing such a latent heat storing medium or a composition thereof (with respect to the clathrate hydrates in substantially solid form and in slurry form obtained by dispersing the solid in water, reference can be made to Jpn. Pat. Appln. KOKOKU Publication No. 57-35224 and Japanese Patent No. 3309760, respectively).

Hereinafter, the "clathrate hydrate comprising a quaternary ammonium compound as a guest and water molecules as a host" may be simply referred to as the "clathrate hydrate of a quaternary ammonium compound" or "clathrate hydrate comprising a quaternary ammonium compound as a guest."

Generally, with respect to the latent heat storing medium, the larger the amount of heat stored per weight (heat storage density), the preferably higher the heat storage efficiency and thermal transport efficiency. This is true even when the latent heat storing medium or composition thereof is based on a clathrate hydrate of a quaternary ammonium compound. From this viewpoint, such a clathrate hydrate with higher heat storage density is desired.

BRIEF SUMMARY OF THE INVENTION

The heat storage density can be increased by increasing the concentration of an aqueous solution of quaternary ammonium compound to thereby increase the solid-phase ratio of generated hydrate particles. However, increasing the concentration or density of quaternary ammonium compound with the intent to increase the heat storage density poses the problem of causing the material cost of the latent heat storing medium to be unfavorably high. Moreover, when particularly a slurry obtained by dispersing a clathrate hydrate of quaternary ammonium compound in water or an aqueous solution is used as a latent heat storing medium or composition thereof, the heat storage density can be increased by increasing the weight ratio or solid-phase ratio of hydrate particles present in water. However, excessively increasing the above ratio poses the problem of inviting an increase of slurry viscosity leading to decrease of flowability and poor transportability.

It is an object of the present invention to, for solving the above problems, provide a clathrate hydrate comprising a quaternary ammonium compound as a guest that exhibits an enhanced latent heat storing capability, a process for producing such a clathrate hydrate and an apparatus therefor, a latent heat storing medium comprising such a clathrate hydrate as a composition, a method of increasing the amount of latent heat of a clathrate hydrate and a processing apparatus for increasing the amount of latent heat of a clathrate hydrate.

The inventors have conducted extensive studies with a view toward solving the above problems, and as a result have arrived at the following novel findings.

(1) When a clathrate hydrate comprising a quaternary ammonium compound as a guest generated by cooling an aqueous solution of quaternary ammonium compound while blowing a gas thereinto or by blowing a gas into an aqueous solution of quaternary ammonium compound and then cooling the aqueous solution is collected and the amount of heat stored thereby is measured, (1a) the heat storage amount is increased over that exhibited when no gas is blown, and (1b) not only is the heat storage amount increased but also the melting point thereof is changed.

Further, the following novel findings were obtained.

(2) When the clathrate hydrate generated by the operation (1) above is melted, the same gas as blown at the generation thereof is released.

(3) Even when the clathrate hydrate generated by the operation (1) above is melted and the operation (1) above is conducted once more to thereby generate a clathrate hydrate, the phenomena (1a), (1b) and (2) above occur.

(4) The degree of the occurrence of each of the phenomena (1a), (1b) and (2) above depends on the type of the gas.

These phenomena can be consistently elucidated by presuming that the clathrate hydrate generated by cooling an aqueous solution of quaternary ammonium compound while blowing an appropriate gas thereinto or by blowing an appropriate gas into an aqueous solution of quaternary ammonium compound and then cooling the aqueous solution is at least one of the following three substances:

(a) a clathrate hydrate formed as a result of trapping of the appropriate gas inside a clathrate hydrate comprising the quaternary ammonium compound as a guest, (b) a clathrate hydrate formed as a result of inclusion of the appropriate gas together with the quaternary ammonium compound as guest molecules, and (c) a mixture of a clathrate hydrate comprising the quaternary ammonium compound as a guest and a clathrate hydrate comprising the appropriate gas as a guest.

The present invention has been made on the basis of the above findings and, in particular, has the following subject matters.

According to a first aspect of the present invention, there is provided a clathrate hydrate with latent heat storing capability comprising a quaternary ammonium compound as a guest, further comprising a gas supplied from outside as a further guest to thereby enhance the latent heat storing capability.

According to a second aspect of the present invention, there is provided a clathrate hydrate with latent heat storing capability comprising both a quaternary ammonium compound and a gas as guests, the clathrate hydrate being produced either by supplying a gas from outside to an aqueous solution containing a quaternary ammonium compound and cooling the aqueous solution, or by mixing a gas supplied from outside with an aqueous solution containing a quaternary ammonium compound and then cooling the aqueous solution.

According to a third aspect of the present invention, there is provided a latent heat storing medium comprising the clathrate hydrate according to the first or second aspect as a composition.

According to a fourth aspect of the present invention, there is provided a latent heat storing medium comprising a clathrate hydrate with enhanced latent heat storing capability as a composition, the clathrate hydrate being produced either by supplying a gas from outside to an aqueous solution containing a quaternary ammonium compound and cooling the aqueous solution, or by mixing a gas supplied from outside with an aqueous solution containing a quaternary ammonium compound and then cooling the aqueous solution.

According to a fifth aspect of the present invention, there is provided a process for producing a clathrate hydrate with latent heat storing capability, comprising a step of: enhancing the latent heat storing capability either by supplying a gas from outside to an aqueous solution containing a quaternary ammonium compound and cooling the aqueous solution, or by mixing a gas supplied from outside with an aqueous solution containing a quaternary ammonium compound and then cooling the aqueous solution.

According to a sixth aspect of the present invention, there is provided the process for producing a clathrate hydrate according to the fifth aspect, wherein that the gas supplied from outside is one for deoxygenation of the aqueous solution.

According to a seventh aspect of the present invention, there is provided the process for producing a clathrate hydrate according to the fifth aspect, wherein the gas supplied from outside has a temperature lower than a melting point of the clathrate hydrate.

According to an eighth aspect of the present invention, there is provided the process for producing a clathrate hydrate according to the fifth aspect, wherein the gas supplied from outside is one cooled by supplying the same to an ice thermal storage tank and has a temperature lower than a melting point of the clathrate hydrate.

According to a ninth aspect of the present invention, there is provided a latent heat storing medium comprising the clathrate hydrate produced by the process according to any of the fifth to eighth aspects as a composition.

According to a tenth aspect of the present invention, there is provided a method of increasing the amount of latent heat of a clathrate hydrate comprising a quaternary ammonium compound as a guest, comprising a step of: either supplying a gas from outside to an aqueous solution containing a quaternary ammonium compound and cooling the aqueous solution, or mixing a gas supplied from outside with an aqueous solution containing a quaternary ammonium compound and then cooling the aqueous solution.

According to an eleventh aspect of the present invention, there is provided the method of increasing the amount of latent heat of a clathrate hydrate according to the tenth aspect, wherein the gas supplied from outside is one for deoxygenation of the aqueous solution.

According to a twelfth aspect of the present invention, there is provided an apparatus for the production of a clathrate hydrate with latent heat storing capability, comprising: a mixer configured to supply a gas to an aqueous solution containing a quaternary ammonium compound and mix them; and a generator configured to cool the aqueous solution mixed with the gas to thereby generate a clathrate hydrate with enhanced latent heat storing capability.

The apparatus for the production of a clathrate hydrate according to the twelfth aspect of the present invention may further comprise a separator configured to separate a residual gas not having contributed to the generation of the clathrate hydrate.

According to a thirteenth aspect of the present invention, there is provided an apparatus for the production of a clathrate hydrate with latent heat storing capability, comprising: a gas supplying means for supplying a gas to an aqueous solution containing a quaternary ammonium compound; and a cooling means for cooling the aqueous solution, the apparatus producing a clathrate hydrate with enhanced latent heat storing capability by supplying the gas to the aqueous solution with the gas supplying means in the stage of cooling with the cooling means.

According to a fourteenth aspect of the present invention, there is provided a processing apparatus for increasing an amount of latent heat of a clathrate hydrate comprising a quaternary ammonium compound as a guest, comprising: a mixer configured to supply a gas to an aqueous solution containing a quaternary ammonium compound and mix them; and a generator configured to cool the aqueous solution mixed with the gas to thereby generate a clathrate hydrate.

According to a fifteenth aspect of the present invention, there is provided a processing apparatus for increasing an amount of latent heat of a clathrate hydrate comprising a quaternary ammonium compound as a guest, comprising: a gas supplying means for supplying a gas to an aqueous solution containing a quaternary ammonium compound; and a cooling means for cooling the aqueous solution, the apparatus supplying the gas to the aqueous solution with the gas supplying means in the stage of cooling with the cooling means.

The present invention is to be understood and interpreted on the basis of the following particulars (1) to (6), by which the technical scope thereof is to be defined.

(1) Representative examples of the quaternary ammonium compounds for use in the present invention are a tetra-n-butylammonium salt, a tetraiso-pentylammonium salt, a tri-n-butyl-n-pentylammonium salt and the like.

(2) The latent heat storing medium of the present invention may consist of the clathrate hydrate of the present invention per se. Alternatively, it may be composed of the clathrate hydrate as an essential composition and another composition added to or incorporated in the same, or may have the clathrate hydrate dispersed, included, suspended, etc., in another substance. The latent heat storing medium can be in the form of a solid, a liquid, a gel, a slurry, a microcapsule (in the state of being filled in a microcapsule) or the like, and the form of the latent heat storing medium of the present invention is not particularly limited. For example, even the latent heat storing medium is a solid in the initial stage and can be processed to a liquid or gel by the addition of a surfactant or a gelling agent, as long as the clathrate hydrate of the present invention is contained therein as a composition, it is included in the latent heat storing medium of the present invention. The mode of use of the latent heat storing medium of the present invention is not limited. Not only a latent heat storing medium subjected to heat utilization at a fixed position but also a latent heat storing medium subjected to heat utilization at a destination due to the involvement of migration by a driving force or natural convection is not excluded from the present invention from the viewpoint of the variety of use.

(3) The supply of a gas to an aqueous solution containing a quaternary ammonium compound (hereinafter simply referred to as the aqueous solution) in the present invention is relative. The gas supply may naturally comprise sending a gas toward the aqueous solution and may also comprise sending the aqueous solution toward a gas. A typical example of the former case is bubbling of a gas into an area where the aqueous solution is present from outside of the area. In this case, with respect to the bubble diameter, the smaller the better. A typical example of the latter case is spraying of the aqueous solution into an area where a gas is present from outside of the area. In this case, with respect to the diameter of aqueous solution droplet, the smaller the better. At any rate, it is preferred to perform the supply of a gas to the aqueous solution by a method appropriate for increasing the area of contact between the gas and the aqueous solution.

(4) The present invention reflects a technical idea based on a novel method of generation resulting from the addition of a technical matter of supplying a gas to the aqueous solution from outside to the conventional method of generating a clathrate hydrate through cooling of the aqueous solution containing a quaternary ammonium compound. Therefore, the supply of a gas from outside per se has a technical feature.

However, in the present invention, the gases to be supplied from outside do not include hydrogen and helium. The clathrate hydrate generated by, either while supplying from outside a gas of small molecules, such as hydrogen or helium, to the aqueous solution containing a quaternary ammonium compound or after the gas supply from outside and mixing, cooling the aqueous solution did not exhibit any increase of latent heat storage amount.

Meanwhile, in the present invention, the gases to be supplied from outside include a gas that can be trapped in a clathrate compound comprising a quaternary ammonium compound as a guest and further a gas that can be included in water molecules together with a quaternary ammonium compound, thereby becoming a constituent of a clathrate hydrate. Particular examples of the gases include gases of molecules larger than those of hydrogen or helium, such as air, nitrogen, oxygen, carbon dioxide, argon, krypton, xenon, hydrogen sulfide, methane, ethane, propylene, trimethylene oxide, propane, butane and various chlorofluorocarbons.

Therefore, although the technical feature of the present invention is the supply of a gas from outside per se, the gas can be specified as being a gas of molecules larger than those of hydrogen or helium and being either a gas that can be trapped in a clathrate compound comprising a quaternary ammonium compound as a guest or a gas that can be included in water molecules together with a quaternary ammonium compound, thereby becoming a constituent of a clathrate hydrate.

(5) In the present invention, the pressure under which the clathrate hydrate with enhanced latent heat storing capability or latent heat storing effects is generated or produced is not particularly limited. The generation or production can be carried out under an increased or ordinary pressure or in vacuum as long as the intended clathrate hydrate can be generated or produced. Focusing on the rate of dissolution of the gas into the aqueous solution and the maximum concentration of dissolved gas, an increased pressure is preferred to the ordinary pressure and the ordinary pressure is preferred to vacuum for the efficient generation or production of a clathrate hydrate ensuring a large latent heat storage amount. On the other hand, when equipment and operation costs are focused on, the ordinary pressure is most preferred.

(6) The production apparatuses according to the twelfth and thirteenth aspects of the present invention include an apparatus incorporated as a means for increasing the latent heat storage amount in part of heat utilization system using a latent heat storing medium comprising a clathrate hydrate, what is termed one used in the sense of a clathrate hydrate processing apparatus.

In the present invention, as the latent heat storing capability of the clathrate hydrate is enhanced, the amount of quaternary ammonium compound as a guest compound of clathrate hydrate required for storing the requisite amount of latent heat can be reduced. Accordingly, not only can the material cost be reduced but also the volume of the container required for accommodating the clathrate hydrate can be reduced and the facilities comprising the container can be reduced in size. In particular, when a thermal transport is carried out using the clathrate hydrate (for example, in the form of a slurry of high fluidity and low viscosity), the amount of clathrate hydrate required for transporting a given latent heat storage amount can be reduced, so that not only can the material cost be reduced but also downsizing of the transport piping and reduction of the transport power can be realized.

Upon multilateral analysis of the present invention, the action and effect exerted by each of the aspects of the invention are as follows.

According to the first and second aspects of the present invention, there can be realized a clathrate hydrate with latent heat storing capability higher than that of a clathrate hydrate in which a gas supplied from outside is not trapped or a clathrate hydrate not including the gas.

According to the third and fourth aspects of the present invention, there can be realized a latent heat storing medium comprising as a composition a clathrate hydrate with enhanced latent heat storing capability or enhanced latent heat storage amount.

According to the fifth aspect of the present invention, there can be produced a clathrate hydrate with latent heat storing capability higher than that of a clathrate hydrate in which a gas supplied from outside is not trapped or a clathrate hydrate not including the gas.

According to the sixth aspect of the present invention, an aqueous solution containing a quaternary ammonium compound for which deoxygenation treatment has been performed can be provided by supplying a gas for deoxygenation (for example, nitrogen gas) to the aqueous solution, and from the thus provided aqueous solution, there can be produced a clathrate hydrate with enhanced latent heat storing capability or latent heat storing effects.

This is especially beneficial when a slurry resulting from the dispersion of clathrate hydrate particles in water or an aqueous solution is used as a latent heat storing medium. Illustratively, a deoxygenating corrosion inhibitor capable of reducing the amount of oxygen dissolved in the slurry is occasionally incorporated in the slurry in order to inhibit the corrosion of the internal-surface material of a container, piping or the like by the slurry. In such occasions, performing deoxygenation treatment by supplying a gas for deoxygenation to the above aqueous solution corresponding to the starting liquid of the slurry can exert two effects, the one being reduction of the amount of incorporated corrosion inhibitor or unnecessity of the incorporation of the corrosion inhibitor and the other being capability of increasing the latent heat storage amount of the slurry.

In the seventh aspect of the present invention, as the temperature of the gas per se is lower than the melting point of the clathrate hydrate, the gas when supplied to the aqueous solution can be utilized as a cold heat for cooling the aqueous solution. Thus, the cold heat can be an addition to the cooling by a heat exchange with a refrigerant. Therefore, cooling can be effected with higher efficiency, so that a clathrate hydrate with enhanced latent heat storing capability or latent heat storing effects or a slurry thereof can be produced.

In the eighth aspect of the present invention, as the melting point of the clathrate hydrate comprising a quaternary ammonium compound as a guest is 0° C. or higher and the gas having been supplied to an ice thermal storage tank and cooled therein has a temperature close to 0° C., the gas when supplied to the aqueous solution can be utilized as a cold heat for cooling the aqueous solution. Thus, the cold heat can be an addition to the cooling by a heat exchange with a refrigerant. Therefore, cooling can be effected with higher efficiency, so that a clathrate hydrate with enhanced latent heat storing capability or latent heat storing effects or a slurry thereof can be produced.

Occasionally, a gas (especially, air) is supplied to the ice thermal storage tank in order to, for example, agitate the cold water thereinside (see, for example, Jpn. UM Appln. KOKAI Publication No. S62-117435). As the gas drawn out from the ice thermal storage tank has a temperature close to 0° C. which is lower than the melting point of the clathrate hydrate, the gas when supplied to the aqueous solution can be utilized as a cold heat for cooling the aqueous solution and can be an addition to the cooling by a heat exchange with a refrigerant. Therefore, cooling can be effected with higher efficiency, so that a clathrate hydrate with enhanced latent heat storing capability or latent heat storing effects or a slurry thereof can be produced. Moreover, the cold heat released from the ice thermal storage tank through the gas supplied for the purpose of agitation can be utilized for the production of a clathrate hydrate or a slurry thereof, thereby providing a rational system and contributing to energy saving.

According to the ninth aspect of the present invention, there can be realized a latent heat storing medium comprising as a composition a clathrate hydrate with enhanced latent heat storing capability or enhanced latent heat storage amount.

According to the tenth aspect of the present invention, there can be increased the amount of latent heat of a clathrate hydrate comprising a quaternary ammonium compound as a guest generated by cooling an aqueous solution containing a quaternary ammonium compound.

According to the eleventh aspect of the present invention, the amount of latent heat of a clathrate hydrate comprising a quaternary ammonium compound as a guest generated by cooling an aqueous solution containing a quaternary ammonium compound can be increased in conjunction with the deoxygenation treatment of the aqueous solution. This is especially beneficial when a slurry resulting from the dispersion of clathrate hydrate particles in water or an aqueous solution is used as a latent heat storing medium, for the same reason as mentioned in the sixth aspect of the present invention.

In the twelfth aspect of the present invention, the process of mixing a gas supplied from outside with an aqueous solution containing a quaternary ammonium compound and then cooling the aqueous solution can be embodied in the form of an apparatus, so that an apparatus for the production of a clathrate hydrate with enhanced heat storing capability can be realized.

In the twelfth aspect of the present invention provided further with a separator configured to separate any residual gas not having contributed to the generation of a clathrate hydrate, there can be realized an apparatus for the production of a clathrate hydrate that is capable of separating the residual gas not having contributed to the generation of a clathrate hydrate with enhanced heat storing capability. The thus separated residual gas can be reused in the production of a clathrate hydrate or used for other purposes.

In the thirteenth aspect of the present invention, the process of supplying a gas from outside to an aqueous solution containing a quaternary ammonium compound and cooling the aqueous solution can be embodied in the form of an apparatus, so that an apparatus for the production of a clathrate hydrate with enhanced heat storing capability can be realized.

In the fourteenth aspect of the present invention, the process of mixing a gas supplied from outside with an aqueous solution containing a quaternary ammonium compound and then cooling the aqueous solution can be embodied in the form of an apparatus, so that a processing apparatus for increasing the amount of latent heat of a clathrate hydrate can be realized.

In the fifteenth aspect of the present invention, the process of supplying a gas from outside to an aqueous solution containing a quaternary ammonium compound and cooling the aqueous solution can be embodied in the form of an apparatus, so that a processing apparatus for increasing the amount of latent heat of a clathrate hydrate can be realized.

When the clathrate hydrate is melted, the gas trapped in the clathrate hydrate is released. The released gas can be reused in the production of a clathrate hydrate or used for other purposes.

BRIEF DESCRIPTION OF THE SEVERAL VIEWS OF THE DRAWING

FIG. 4 is an illustration diagram of an ice thermal storage tank for ice thermal storage cooling system for use in a refrigerated air conditioning according to a further embodiment of the present invention.

DETAILED DESCRIPTION OF THE INVENTION

Figure 1:
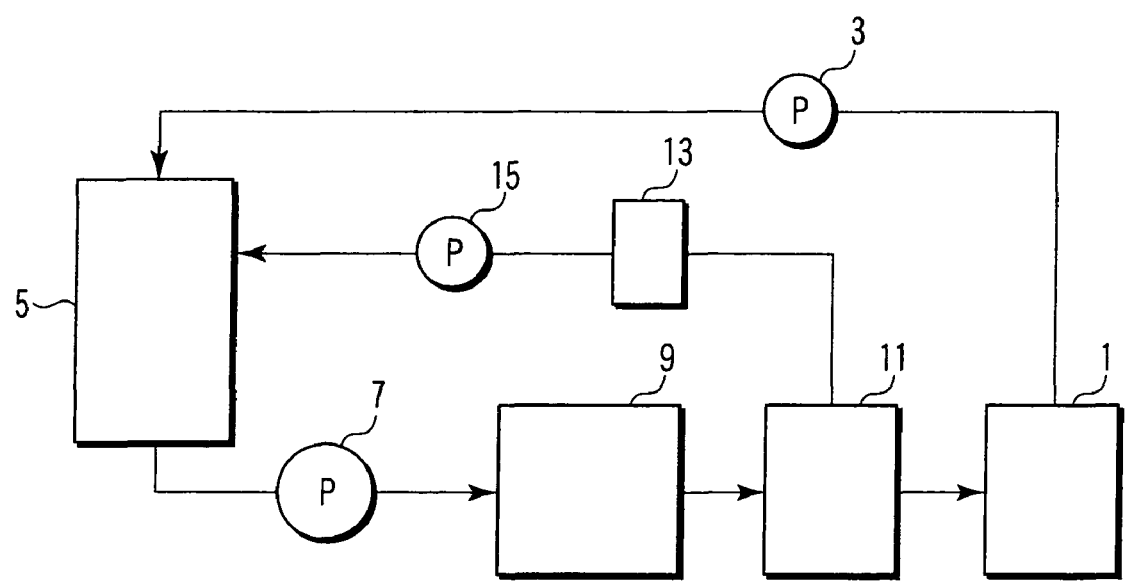
FIG. 1 is an illustration diagram of an apparatus for the production of a clathrate hydrate according to one embodiment of the present invention.

Experimental results for proving the effects of the present invention will be first described, and then particular embodiments will be described.

[Experiment 1]

In Experiment 1, tetra-n-butylammonium bromide (TBAB) was used as a quaternary ammonium compound. Two trials, namely, the one in which gas blowing was not performed in the stage of generating a clathrate hydrate slurry and the other in which gas blowing was performed in the stage were carried out, and the heat storage amounts and melting points of generated clathrate hydrate slurries were compared with each other.

The particulars of the experiment are as follows.

Under ordinary pressure, a 14.4 wt % aqueous TBAB solution held at room temperature was placed in a glass beaker. While blowing each of gases (air, nitrogen and carbon dioxide) through a bubbler into the glass beaker, the glass beaker was cooled by immersing the same in a cooling liquid held at 0° C., thereby generating a clathrate hydrate of TBAB comprising the gas. Thus, clathrate hydrate slurries were produced. During the cooling, the contents of the beaker were continuously agitated.

Each of the produced clathrate hydrate slurries was placed in a heat-insulating container, and heated under agitation by means of an immersed electrical heater, thereby melting the clathrate hydrate slurry. The amount of heat applied thereto and the temperature of the clathrate hydrate slurry were measured, thereby determining the heat storage amount in a temperature range of 7° to 10° C. Further, the temperature at which the solid clathrate hydrate of each of the clathrate hydrate slurries was completely melted (melting point) was measured.

Measurement results are given in Table 1. An increase of the heat storage amount is referred to as a heat increase. In order to show the increase of heat storage amount (heat increase) by gas blowing, Table 1 gives a heat increase ratio calculated providing that the heat storage amount exhibited when no gas blowing is performed is 1.

TABLE 1

| Gas | Heat storage amount (kcal/kg) | Heat increase ratio | m.p. (° C.) |
|---|---|---|---|
| None | 10.0 | 1 | 8 |
| Air | 12.1 | 1.2 | 9 |
| Nitrogen | 11.6 | 1.2 | 9 |
| Carbon dioxide | 13.8 | 1.4 | 10 |

As apparent from Table 1, with respect to the 14.4 wt % aqueous TBAB solution, the heat storage amount exhibited when air, nitrogen or carbon dioxide was blown was greater than that exhibited when no gas blowing was performed. It was ascertained that a heat increment of about 20% was attained by blowing air or nitrogen while a heat increment of about 40% was attained by blowing carbon dioxide.

[Experiment 2]

In Experiment 2, the experiment was performed in accordance with the same procedure as in Experiment 1 except that the concentration of the aqueous TBAB solution was varied. The heat storage amount and melting point of each of the thus produced clathrate hydrate slurries were measured.

The measurement results obtained when the concentration of the aqueous TBAB solution was 8 wt % are given in Table 2. The heat storage amount was measured in a temperature range of 5° to 8° C.

TABLE 2

| Gas | Heat storage amount (kcal/kg) | Heat increase ratio | m.p. (° C.) |
|---|---|---|---|
| None | 5.9 | 1 | 6 |
| Air | 6.6 | 1.1 | 6 |
| Carbon dioxide | 7.4 | 1.3 | 7 |

As apparent from Table 2, it was ascertained that with respect to the 8 wt % aqueous TBAB solution, a heat increment of about 10% was attained by blowing air while a heat increment of about 30% was attained by blowing carbon dioxide over the heat storage amount exhibited when the blowing was not performed.

Now, the measurement results obtained when the concentration of the aqueous TBAB solution was 25 wt % are given in Table 3. The heat storage amount was measured in a temperature range of 9° to 12° C.

TABLE 3

| Gas | Heat storage amount (kcal/kg) | Heat increase ratio | m.p. (° C.) |
|---|---|---|---|
| None | 13.0 | 1 | 10 |
| Air | 13.9 | 1.1 | 10 |
| Carbon dioxide | 21.0 | 1.6 | 12 |

As apparent from Table 3, it was ascertained that with respect to the 25 wt % aqueous TBAB solution, a heat increment of about 10% was attained by blowing air while a heat increment of about 60% was attained by blowing carbon dioxide over the heat storage amount exhibited when the blowing was not performed.

In Experiments 1 and 2, it was further ascertained that the clathrate hydrate slurries produced by blowing gases exhibited the same satisfactory fluidity, required for use as a thermal transport medium, as that exhibited when no gas blowing was performed.

Microbubbles occurred during the melting of hydrate solid as a result of heating the clathrate hydrate slurries. It was ascertained that the component of the gas trapped from the bubbles was the blown gas itself.

In the above Experiments 1 and 2, the temperature of the blown gas was room temperature. In another experiment, the experiment was carried out under the same conditions as in Experiments 1 and 2 except that the gas was cooled in advance to 8° C. or below lower than the melting point of the clathrate hydrate of tetra-n-butylammonium bromide and blown. It was ascertained that an enhanced heat increase could be attained in this experiment.

In the above Experiments 1 and 2, tetra-n-butylammonium bromide (TBAB) was used as a quaternary ammonium compound. Similar effects can be exerted even when quaternary ammonium compounds other than TBAB are used. As examples of other quaternary ammonium compounds, there can be mentioned alkylammonium salts, such as a tetra-n-butylammonium salt, a tetra-iso-pentylammonium salt and a tri-n-butyl-n-pentylammonium salt.

[Experiment 3]

The increase of heat storage amount by gas blowing was measured using tetra-iso-pentylammonium bromide (TiPAB) as a tetra-iso-pentylammonium salt. The experiment was performed in accordance with the same procedure as in Experiment 1 except that a 10 wt % aqueous TiPAB solution was used. The heat storage amount and melting point of each of the thus produced clathrate hydrate slurries were measured. The measurement results are given in Table 4. The heat storage amount was measured in a temperature range of 27° to 30° C.

TABLE 4

| Gas | Heat storage amount (kcal/kg) | Heat increase ratio | m.p. (° C.) |
|---|---|---|---|
| None | 9.7 | 1 | 28 |
| Air | 11.0 | 1.1 | 29 |

As apparent from Table 4, it was ascertained that with respect to the 10 wt % aqueous TiPAB solution, a heat increment of about 10% was attained by blowing air over the heat storage amount exhibited when the blowing was not performed.

[Experiment 4]

The increase of heat storage amount by gas blowing was measured using tri-n-butyl-n-pentylammonium bromide (TBPAB) as a tri-n-butyl-n-pentylammonium salt. The experiment was performed in accordance with the same procedure as in Experiment 1 except that a 17 wt % aqueous TBPAB solution was used. The heat storage amount and melting point of each of the thus produced clathrate hydrate slurries were measured. The measurement results are given in Table 5. The heat storage amount was measured in a temperature range of 5° to 8° C.

TABLE 5

| Gas | Heat storage amount (kcal/kg) | Heat increase ratio | m.p. (° C.) |
|---|---|---|---|
| None | 11.1 | 1 | 7 |
| Air | 12.2 | 1.1 | 7 |

As apparent from Table 5, it was ascertained that with respect to the 17 wt % aqueous TBPAB solution, a heat increment of about 10% was attained by blowing air over the heat storage amount exhibited when the blowing was not performed.

As apparent from Experiments 1 to 4, it was ascertained that a heat increase could be attained by blowing a gas into an aqueous solution of tetra-n-butylammonium bromide (TBAB), tetra-iso-pentylammonium bromide (TiPAB) or tri-n-butyl-n-pentylammonium bromide (TBPAB) as a quaternary ammonium compound and cooling the aqueous solution, thereby producing a clathrate hydrate slurry, over the heat storage amount exhibited when the gas was not blown. It was found that the thus produced clathrate hydrate slurries were useful as a latent heat storing medium.

Further, in Experiments 1 to 4, it was ascertained that the clathrate hydrate slurries produced by blowing gases exhibited the same satisfactory fluidity, required for use as a thermal transport medium, as that exhibited when no gas blowing was performed.

In the above Experiments 1 to 4, it was ascertained that a clathrate hydrate comprising a quaternary ammonium compound and a gas as guests was generated by mixing a gas supplied from outside with an aqueous solution containing a quaternary ammonium compound and cooling the aqueous solution. Alternatively, a clathrate hydrate comprising a quaternary ammonium compound and a gas as guests can be generated by adding a gas generator capable of generating a gas to an aqueous solution of quaternary ammonium compound in advance and, while causing the gas generator to generate a gas in the aqueous solution or after the generation of the gas, cooling the aqueous solution.

When a clathrate hydrate comprising a quaternary ammonium compound as a guest generated by adding, for example, a carbonate or hydrogen carbonate as a gas generator to an aqueous solution of quaternary ammonium compound in advance and, while causing the carbonate or hydrogen carbonate to generate carbon dioxide in the aqueous solution or after the generation of carbon dioxide, cooling the aqueous solution is collected and the heat storage amount thereof is measured, the phenomena of increasing of the heat storage amount over that exhibited when no gas generation is effected and changing of the melting point can be ascertained. Moreover, when the generated clathrate hydrate is melted, the phenomenon of carbon dioxide release can be ascertained.

The generation of carbon dioxide from the carbonate or hydrogen carbonate in the aqueous solution can be effected by lowering the pH value of the aqueous solution. The pH value may be lowered by adding an acid, or by an electrochemical method utilizing an electrode reaction.

When the carbon dioxide trapped in the clathrate hydrate is released by melting the clathrate hydrate, the released carbon dioxide can be used in a reaction for regenerating the carbonate or hydrogen carbonate.

[Experiment 5]

In this Experiment, the amount of heat of the clathrate hydrate comprising a quaternary ammonium compound as a guest generated by adding a carbonate or hydrogen carbonate to an aqueous solution of quaternary ammonium compound in advance and, while causing the carbonate or hydrogen carbonate to generate carbon dioxide in the aqueous solution, cooling the aqueous solution was measured. Tetra-n-butylammonium bromide (TBAB) was used as the quaternary ammonium compound. Two trials, namely, the one in which carbon dioxide was generated by the addition of a carbonate or hydrogen carbonate in the stage of generating a hydrate slurry and the other in which no carbon dioxide was generated in the stage were carried out, and the heat storage amounts and melting points of produced hydrate slurries were compared with each other.

The particulars of the experiment are as follows.

A starting aqueous solution was prepared by dissolving 15.0 wt % of TBAB and 4.0 wt % of sodium hydrogen carbonate in water. The pH value of the thus prepared starting aqueous solution was 8.3.

Under ordinary pressure, the starting aqueous solution was placed in a glass beaker and cooled by immersing the glass beaker in a cooling liquid held at 0° C., thereby generating a hydrate and thus producing a hydrate slurry. During the cooling, the contents of the beaker were continuously agitated. Two trials, the one in which during the cooling, a minute amount of sulfuric acid was added to such an extent that the pH value of the starting aqueous solution was lowered to 6.8, thereby causing sodium hydrogen carbonate to generate carbon dioxide and the other in which no sulfuric acid was added and thus no carbon dioxide was generated, were carried out.

Each of the thus produced hydrate slurries was placed in a heat-insulating container, and heated by means of an immersed electrical heater under agitation, thereby melting the hydrate slurry. The amount of heat applied thereto and the temperature of the hydrate slurry were measured, thereby determining the heat storage amount in a temperature range of 7° to 10° C. Further, the melting point at which the solid hydrate of each of the hydrate slurries was completely melted was measured.

Measurement results are given in Table 6 below. With respect to the ratio of increase of heat storage amount by the generation of carbon dioxide, Table 6 gives a heat increase ratio calculated providing that the heat storage amount exhibited when no carbon dioxide was generated is 1. As apparent from Table 6, it was ascertained that a heat increment of about 20% was attained by causing the sodium hydrogen carbonate to generate carbon dioxide over the heat storage amount exhibited when no carbon dioxide was generated.

TABLE 6

| Carbon dioxide generated | Heat storage amount (kcal/kg) | Heat increase ratio | m.p. (° C.) |
| --- | --- | --- | --- |
| None | 11.0 | 1 | 8 |
| Found | 13.6 | 1.2 | 10 |

The following embodiments are based on the above experimental results.

Embodiment 1

FIG. 1 is an illustration diagram of an apparatus for the production of a clathrate hydrate according to this Embodiment 1. Referring to FIG. 1, the apparatus for the production of a clathrate hydrate according to this Embodiment 1 will be described below.

The apparatus for the production of a clathrate hydrate according to this Embodiment 1 includes a heat storage tank 1 for storing not only an aqueous solution containing a quaternary ammonium compound but also a generated clathrate hydrate; a mixer 5 configured to receive the aqueous solution supplied from the heat storage tank 1, supply a gas to the aqueous solution and mix them; a generator 9 configured to cool the aqueous solution containing the quaternary ammonium compound and gas mixed together by the mixer 5, thereby generating a clathrate hydrate comprising the gas and the quaternary ammonium compound as guests; and a separator 11 configured to receive the clathrate hydrate and unreacted gas supplied from the generator 9 and separate the unreacted gas therefrom.

Each of the members of the apparatus will be described below in detail.

<Heat Storage Tank>

The heat storage tank 1 stores not only an aqueous solution containing a quaternary ammonium compound but also a generated clathrate hydrate. The aqueous solution containing a quaternary ammonium compound stored in the heat storage tank 1 is pumped out and fed into the mixer 5 by means of a pump 3.

<Mixer>

The mixer 5 supplies a gas to the aqueous solution containing a quaternary ammonium compound and mixes them. After the mixing of the aqueous solution containing a quaternary ammonium compound with the gas by means of the mixer 5, the resultant mixed fluid is fed by means of a pump 7 to the generator 9.

One form of the mixer 5 comprises a tank filled with an aqueous solution that is configured to disperse a gas as microbubbles in the aqueous solution. In this instance, smaller bubble diameters are preferred from the viewpoint of realizing a large gas-liquid contact area.

Another form of the mixer 5 may comprise a container filled with a gas in which an aqueous solution is sprayed through a spray nozzle so as to realize contact of the aqueous solution with the gas and dissolution of the gas in the aqueous solution.

Without disposing any mixer 5, a gas may be supplied to the aqueous solution held in the generator 9 to thereby accomplish mixing of the aqueous solution with the gas.

<Generator>

The generator 9 is equipped with cooling means, by which the aqueous solution containing the quaternary ammonium compound and gas mixed together by means of the mixer 5 is cooled to thereby generate a clathrate hydrate comprising the gas and the quaternary ammonium compound as guests. It is preferred to furnish the generator 9 with agitating means.

The clathrate hydrate is generated and agitated in the generator 9, so that a hydrate slurry in which clathrate hydrate particles are dispersed in the aqueous solution is produced.

In the generator 9, an unreacted gas is present together with the above clathrate hydrate.

<Separator>

The separator 11 is configured to receive the clathrate hydrate and unreacted gas supplied from the generator 9 and separate the unreacted gas therefrom.

The type of the separator 11 used is arbitrary. For example, a cyclone separator or the like can be used. It is preferred to use the same in combination with, for example, a mist separator of the collision separation type from the viewpoint of minimizing the mingling of slurry droplets into separated gas.

The gas separated by means of the separator 11 is fed back to a gas tank 13 and supplied once more by means of a pump 15 to the mixer 5 where the gas is mixed with the aqueous solution. When the gas is one being cheap and having no influence upon the environment, such as air, the gas may be discharged away without being circulated.

The process for producing a clathrate hydrate by use of the apparatus for the production of a clathrate hydrate comprising the above members will be described below.

The heat storage tank 1 is filled with an aqueous solution containing a quaternary ammonium compound. The aqueous solution is pumped out by means of the pump 3 and fed into the mixer 5. In the mixer 5, a gas is supplied from the gas tank 13 to the fed aqueous solution, thereby achieving mixing of the gas with the aqueous solution and dissolution of the gas in the aqueous solution. The aqueous solution containing the quaternary ammonium compound and gas mixed together by means of the mixer 5 is fed by means of the pump 7 to the generator 9. In the generator 9, the fed aqueous solution is cooled to thereby generate a clathrate hydrate comprising the gas and the quaternary ammonium compound as guests. When agitation is performed in the generator 9, a clathrate hydrate slurry in which clathrate hydrate particles are dispersed in the aqueous solution is produced. The clathrate hydrate slurry produced by the generator 9 and unreacted gas are fed to the separator 11, where the clathrate hydrate slurry and unreacted gas are separated from each other. The thus separated clathrate hydrate slurry is stored in the heat storage tank 1. On the other hand, the gas separated by means of the separator 11 is fed back to the gas tank 13 and supplied once more to the mixer 5 where the gas is utilized.

As apparent from the above experimental results, the amount of heat of the clathrate hydrate comprising a gas and a quaternary ammonium compound as guests stored in the heat storage tank 1 is greater than that exhibited when no gas is included in the clathrate hydrate. Accordingly, in this Embodiment, a clathrate hydrate slurry ensuring a large heat storage amount can be produced by a simple apparatus.

Cooling the gas dispersed and mixed in the aqueous solution in the mixer 5 in advance can help to cool the aqueous solution in the generator 9, thereby contributing to efficient generation of a clathrate hydrate.

In this Embodiment, the gas and the aqueous solution were mixed together by means of the separately disposed mixer 5. Instead, without disposing the mixer 5, the gas may be directly dispersed and mixed in the aqueous solution in the generator 9.

Embodiment 2

Figure 2:
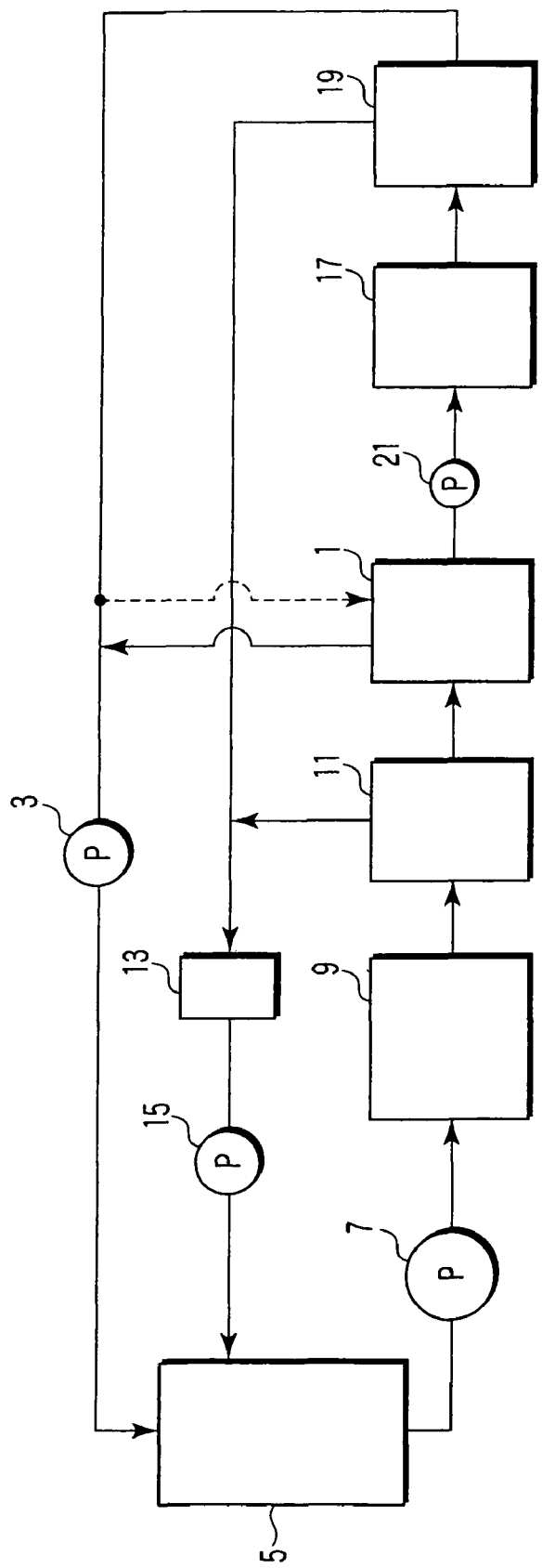
FIG. 2 is an illustration diagram of a refrigerated air conditioning according to one embodiment of the present invention.

FIG. 2 is an illustration diagram of a refrigerated air conditioning according to Embodiment 2 of the present invention.

The refrigerated air conditioning according to this Embodiment includes the apparatus for the production of a clathrate hydrate according to Embodiment 1, and uses the clathrate hydrate slurry produced by the production apparatus as a thermal transport medium. Identical numerals are used to indicate identical members through FIG. 1 and FIG. 2.

The refrigerated air conditioning according to this Embodiment 2 comprises the apparatus for the production of a clathrate hydrate according to Embodiment 1 and, in addition thereto, a cold-heat utilizing unit 17 equipped with a room-air conditioner configured to cool the air inside a room with the use of the clathrate hydrate slurry stored in the heat storage tank 1 and supplied therefrom and a second separator 19 configured to, upon receiving the clathrate hydrate slurry having been subjected to cold-heat utilization in the cold-heat utilizing unit 17 and supplied therefrom, separate the gas and the aqueous solution from each other.

In the refrigerated air conditioning comprising the above members, for example, during nighttime, the aqueous solution held in the heat storage tank 1 is drawn out, fed into the mixer 5, and used to generate a clathrate hydrate slurry in the generator 9. The clathrate hydrate slurry is stored in the heat storage tank 1 as a thermal transport medium for use in daytime cooling operation.

In the daytime cooling operation, the clathrate hydrate slurry stored in the heat storage tank 1 is pumped to flow by means of a pump 21 to the cold-heat utilizing unit 17 (room-air conditioner) as a thermal transport medium. In the room-air conditioner, heat exchange is conducted between the clathrate hydrate slurry and air, thereby achieving supply of cold heat and cooling of the room air. The hydrate of the clathrate hydrate slurry is melted by this heat exchange, thereby becoming a mixed fluid consisting of an aqueous solution and a gas. The mixed fluid is fed back to the second separator 19.

The mixed fluid having been fed back to the second separator 19 is separated into the aqueous solution and the gas. The aqueous solution is fed back to the heat storage tank 1, and part thereof is directly fed to the mixer 5. On the other hand, the gas having been separated by the second separator 19 is stored in the gas tank 13, and later fed to the mixer 5 where the gas is mixed with the aqueous solution.

As apparent from the above, in this Embodiment 2, a clathrate hydrate slurry ensuring a large heat storage amount can be produced and utilized by a simple architecture. Further, as the gas supplied from the gas tank 13 can be circulated and used, when the gas is expensive, cost reduction can be attained. Still further, even if the gas is one negatively impacting the environment, no impact is exerted on the environment as the gas is not discharged outside.

When the gas supplied from the gas tank 13 is one being cheap and having no influence upon the environment, such as air, the gas may be discharged away without being circulated for use.

Further, without disposing the heat storage tank 1, the clathrate hydrate slurry produced by the generator 9 may be directly fed to the cold-heat utilizing unit 17. In this instance, it is preferred to provide the mixer 5 with a large capacity.

Still further, it is not necessary to unify the cold-heat utilizing unit 17 and the room-air conditioner. For example, an arrangement may be made such that water is cooled by the cold-heat utilizing unit 17 and the cooled water is conveyed to the room-air conditioner, thereby utilizing the cold heat.

In the above Embodiments 1 and 2, the aqueous solution and the gas were mixed together in the mixer 5 and cooled in the generator 9. Instead, the gas fed to the mixer 5 may be replaced with a liquid refrigerant so that the liquid refrigerant is mixed with the aqueous solution to thereby not only cool the aqueous solution by the vaporization heat of the liquid refrigerant but also generate a clathrate hydrate comprising a gaseous refrigerant resulting from the vaporization of the liquid refrigerant.

Specifically, the following steps may be taken. An aqueous solution and a condensed liquid refrigerant are fed to the mixer 5 and mixed together there. The resultant liquid mixture is depressurized to a pressure under which the liquid refrigerant vaporizes at a temperature not higher than the temperature inducing the generation of a clathrate hydrate. The depressurization is performed by means of a decompression valve disposed midstream of a piping for feeding the liquid mixture to the generator 9. Thus, the liquid refrigerant vaporizes, so that the aqueous solution is cooled by the vaporization heat, thereby generating a clathrate hydrate comprising a gaseous refrigerant and a quaternary ammonium compound as guests.

By using a gaseous refrigerant as the gas included together with a quaternary ammonium compound as a guest in a clathrate hydrate and directly cooling the aqueous solution by the vaporization heat resulting from the vaporization of the liquid refrigerant as mentioned above, not only can the amount of heat of the clathrate hydrate be increased but also the following effects can be achieved.

At the depressurization of the condensed liquid refrigerant, the periphery thereof is surrounded by the aqueous solution. Thus, the direct effect of the cooling (temperature lowering) by the vaporization of the liquid refrigerant by the depressurization mainly applies to the aqueous solution around the liquid refrigerant. Consequently, the solid surface of piping, container wall or the like can be free from excess cooling, and the effect of cooling straightforwardly and effectively applies to the generation of a hydrate with the result that the generation of a hydrate can be effectively carried out. In addition, the generation of a clathrate hydrate mainly progresses in the aqueous solution, so that the clathrate hydrate does not adhere to the piping, container wall or the like.

As the refrigerant, use can be made natural refrigerants and various chlorofluorocarbons.

Embodiment 3

Figure 3:
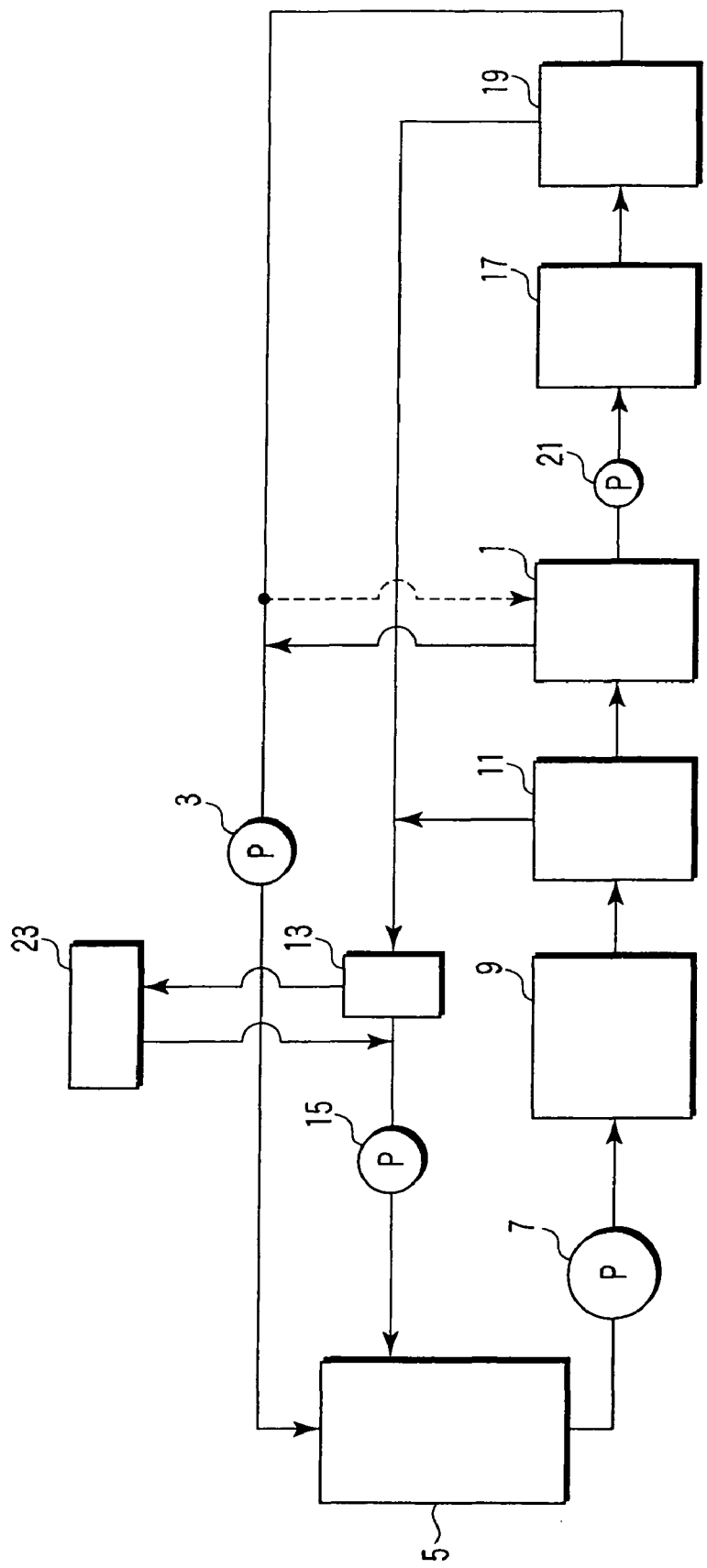
FIG. 3 is an illustration diagram of a refrigerated air conditioning according to another embodiment of the present invention.

FIG. 3 is an illustration diagram of a refrigerated air conditioning according to Embodiment 3 of the present invention.

The refrigerated air conditioning of this Embodiment 3 is the same as that of the Embodiment 2 of the present invention, except that the gas to be supplied to the aqueous solution is one fed to an ice thermal storage tank for ice thermal storage cooling system and cooled there. Those heretofore known can be satisfactorily used as the ice thermal storage tank for ice thermal storage cooling system (see Jpn. UM Appln. KOKAI Publication No. S62-117435).

The refrigerated air conditioning of this Embodiment 3 comprises the members of the refrigerated air conditioning of Embodiment 2 and, in addition thereto, an ice thermal storage tank 23 for ice thermal storage cooling system configured to receive the gas supplied from the gas tank 13 and cool the gas.

FIG. 4 is an illustration diagram of the ice thermal storage tank 23 for ice thermal storage cooling system. Referring to FIG. 4, the ice thermal storage tank for ice thermal storage cooling system will be described below.

The ice thermal storage tank for ice thermal storage cooling system according to this Embodiment comprises a water tank 24 for storing not only water but also produced ice; a cold water pipe 25 for the conveyance of cold water held in the water tank 24 to a cold-heat utilizing equipment disposed outside the water tank 24; a return water pipe 26 for the conveyance of water returning from the cold-heat utilizing equipment to the water tank 24; a refrigerant pipe 27 disposed in the water tank 24 for the circulation of a refrigerant for heat exchange with the water held in the water tank 24; a gas supply pipe 28 for the supply of a gas to a bottom portion of the water tank 24; and a cooled-gas withdrawal pipe 29 for the withdrawal of cooled gas accumulated in an upper zone of the water tank 24.

In the ice thermal storage tank for ice thermal storage cooling system comprising the above members, the water held in the water tank 24 is cooled by heat exchange with the refrigerant fed to the refrigerant pipe 27, thereby achieving ice formation, storage thereof and heat storage. When cold heat is utilized, the stored cold water or ice slurry is conveyed through the cold water pipe 25 to a cold-heat utilizing equipment where cold heat is utilized. The return water from the cold-heat utilizing equipment is fed back through the return water pipe 26 to the water tank 24. When heat storage is intended, a gas is conveyed through the gas supply pipe 28 to a bottom portion of the water tank 24, thereby generating bubbles 30 and agitating the water held in the water tank 24. Thus, the cooling efficiency can be enhanced, and the heat storage efficiency can be increased. The gas is cooled while moving in the water held in the water tank 24. The cooled gas is accumulated in an upper zone of the water tank 24. The cooled gas is drawn out through the cooled gas withdrawal pipe 29 and conveyed to the mixer 5.

The melting point of the clathrate hydrate comprising a quaternary ammonium compound as a guest is 0° C. or higher, and the temperature of the gas having been fed to the ice thermal storage tank and cooled there is close to 0° C. Thus, by supplying the gas to the aqueous solution and mixing them by means of the mixer 5, the gas can be used as a cold heat for cooling the aqueous solution. This can be an addition to the cooling by heat exchange with the refrigerant in the generator 9, so that the cooling can be performed with high efficiency. Therefore, a clathrate hydrate with enhanced latent heat storing capability or latent heat storing effects and a slurry thereof can be produced. As apparent from the above, by supplying a gas to the ice thermal storage tank 23 for ice thermal storage cooling system and mixing the cooled gas with an aqueous solution of quaternary ammonium compound by means of the mixer 5, not only can the cooling efficiency be enhanced through agitation of the water held in the water tank 24 but also a clathrate hydrate with enhanced latent heat storing capability or latent heat storing effects and a slurry thereof can be produced. Further, the cold heat released through the gas from the ice thermal storage tank by the gas supplied for the purpose of agitation can be utilized in the production of a clathrate hydrate or a slurry thereof, thereby achieving rationality and energy saving.

In all the above Embodiments, the heat-storage-amount increasing effect realized by the application of a clathrate hydrate comprising a gas and a quaternary ammonium compound as guests to uses as a heat storing agent have been described. Different effects can be realized by the application of a clathrate hydrate comprising a gas and a quaternary ammonium compound as guests to other uses.

For example, when a latent heat storing medium comprising a clathrate hydrate comprising a gas as a guest is used as a cold insulator for food or the like, a preferred state of preservation can be maintained by choosing the type of the gas in conformity with the object of cold insulation. Namely, when oxygen is demanded as in the case of cold insulation objects living on a cell level, such as seafood, green stuff and flowering grasses to be preserved at low temperatures, oxygen is to be included as a guest in the generation of a clathrate hydrate as a component of cold insulator. If so, as oxygen is released upon the melting of the clathrate hydrate; it becomes feasible to perform cold insulation while feeding oxygen to the object of cold insulation. Therefore, a state highly suitable for the preservation can be realized.

Contrarily, when oxidation is to be suppressed, it is beneficial to use nitrogen or the like as the gas included as a guest. If so, preservation at low temperatures while suppressing oxidation can be realized. Further, when other gaseous atmospheres are to be realized as cold insulation atmospheres, similar measures can be taken.

Incidentally, as a cold insulation container, it is beneficial to use, for example, a bag formed of a material with gas permeability exhibiting no leakage of an aqueous solution.

Moreover, the latent heat storing medium comprising a clathrate hydrate comprising a gas and a quaternary ammonium compound as guests can be used as a heat/gas transport medium capable of simultaneous transportation of heat and a gas.

The latent heat storing medium comprising a clathrate hydrate comprising a gas and a quaternary ammonium compound as guests in the form of a slurry can be utilized as a thermal transport medium. In that case, a slurry of a hydrate comprising a desirable gas is produced. The slurry can be fed to a place needing heat and utilized there, and the gas released upon the melting of the clathrate hydrate can also be utilized.

What is claimed is:

1. An apparatus for production of a clathrate hydrate with latent heat storing capability, comprising:
   a mixer configured to supply a gas to an aqueous solution containing a quaternary ammonium compound and mix them;
   a generator configured to cool the aqueous solution mixed with the gas to thereby generate a clathrate hydrate with enhanced latent heat storing capability comprising the quaternary ammonium compound and the gas as guests, and
   a separator configured to receive the clathrate hydrate and unreacted gas supplied from the generator and separate the unreacted gas.

2. A processing apparatus for increasing an amount of latent heat of a clathrate hydrate comprising a quaternary ammonium compound as a guest, comprising: a mixer configured to supply a gas to an aqueous solution containing a quaternary ammonium compound and mix them; a generator configured to cool the aqueous solution mixed with the gas to thereby generate a clathrate hydrate; and a separator configured to receive the clathrate hydrate and unreacted gas supplied from the generator and separate the unreacted gas.

* * * * *